Patented Mar. 10, 1942

2,275,465

UNITED STATES PATENT OFFICE 2,275,465

PURIFICATION OF ALUMINUM BROMIDE

Herman Pines, Chicago, Ill., assignor to Universal Oil Products Company, Chicago, Ill., a corporation of Delaware No Drawing. Application April 15, 1939, Serial No. 268,021

3 Claims. (Cl. 23—92)

This invention relates to a process of obtaining pure aluminum bromide and more specifically has reference to a process of purifying crude aluminum bromide such as may be produced by the action of bromine on aluminum, or aluminum bromide-containing sludges formed during the use of aluminum bromide as catalyst in hydrocarbon conversion reactions. By the process of this invention, oxygen-containing aluminum compounds resulting from unavoidable reaction of aluminum bromide with air, moisture, or other oxygen-containing materials are separated and aluminum bromide is made available in purified form for further use in hydrocarbon conversion reactions such as alkylation, isomerization, polymerization, etc.

In one specific embodiment the present invention comprises a process for obtaining pure aluminum bromide which comprises contacting a solvent consisting of a saturated hydrocarbon with an aluminum bromide-containing material, withdrawing the solution from the undissolved residue, separating the purified aluminum bromide from said solution, and recycling the recovered solvent to further contact with said aluminum bromide containing material.

The process of this invention may be conducted as a batch operation in which an impure aluminum bromide or an aluminum bromide-containing sludge may be agitated with a solvent, such as some paraffinic hydrocarbon boiling in the approximate range of −50 to 150° C. or a naphthenic hydrocarbon with a boiling point in the order of approximately 40 to 200° C. I have found that aluminum bromide dissolves readily in such solvents, while the common impurities, such as aluminum oxide, aluminum hydroxydibromide and other oxygen-containing aluminum compounds, are sparingly soluble in hydrocarbon solvents and consequently may be allowed to settle and the aluminum bromide solution decanted therefrom. Such solution may then be conducted to another chamber in which the solvent is removed by evaporation at atmospheric or reduced pressure leaving the purified aluminum bromide, or preferably the solution may be cooled to a temperature in the approximate range of 0 to −80° C., at which a substantial portion of the dissolved aluminum bromide separates from the solvent as a white crystalline solid from which the solvent may be removed, warmed to the temperature required for the extraction step and recycled thereto. In case separation of the purified aluminum bromide is effected by the evaporation of the solvent, suitable means are provided for collecting, liquefying, and recycling the solvent to the extraction stage.

Alternatively, a continuous operation may be effected by introducing a solvent and an aluminum bromide-containing material to a suitable chamber in which the solvent passes over or through the material from which it is desired to extract aluminum bromide. When a solvent such as propane, butane, pentane, etc., is employed at a temperature above its normal boiling point, the extraction is carried out under a pressure sufficient to maintain a substantial proportion of the solvent in liquid phase. Equipment for such continuous extraction of aluminum bromide may, for example, consist of a vertical baffled tower in which the solvent passes upward while the aluminum bromide-containing material is dropping downward therethrough so that the incoming fresh solvent contacts with the material containing the relatively lower concentration of aluminum bromide.

The temperature employed in the extraction step of the process of the present invention depends upon the nature of the aluminum bromide-containing material and upon the solvent being used, as it is desirable that the solvent have a high dissolving power for aluminum bromide without itself undergoing decomposition reactions which frequently occur when hydrocarbons are heated in contact with aluminum bromide. During the process of this invention as generally carried out, some solvents, although not decomposing, may undergo isomerization reactions substantially without affecting the efficiency of the aluminum bromide extraction and purification process.

Purification of aluminum bromide by use of a solvent consisting of a saturated hydrocarbon, according to the process of this invention, is preferable to distillation of the aluminum bromide-containing material. Even when such aluminum bromide-containing material is free from organic substances, distillation requires a relatively high temperature in the order of 268° C. to effect separation from oxygen-containing aluminum compounds, such as aluminum oxide; while certain other contaminants may in part volatilize with aluminum bromide. Distillation procedure is further complicated when hydrocarbon materials are present as in aluminum bromine sludges from hydrocarbon conversion reactions, since during heating to the relatively high temperature required for distillation the hydrocarbons present are decomposed.

The following examples are given to illustrate the character of results obtainable by the use of the present process, although the data presented are not introduced with the intention of restricting unduly the broad scope of the invention:

Example I

Crude aluminum bromide produced by reacting nine parts by weight of aluminum turnings, containing small amounts of aluminum oxide, with eighty parts by weight of bromine was shaken with liquid propane at 25° C., under 150 pounds pressure. During this treatment most of the crude product dissolved in the propane, the solution was separated from the solid residue, and the propane was distilled from the solution leaving pure aluminum bromide in the form of a white crystalline solid. Analysis of the residue insoluble in liquid propane showed the presence of aluminum oxide and other oxygen-containing aluminum compounds.

Example II

A sludge formed in the polymerization of ethylene in the presence of aluminum bromide was contacted with butane at 25° C. under 45 pounds pressure. By this treatment substantially all of the aluminum bromide and oily material contained in the sludge were dissolved leaving a residue consisting of aluminum oxide and other oxygen-containing aluminum compounds. The resulting solution was separated from the undissolved residue and cooled to −50° C. whereby pure aluminum bromide crystallized and separated from the butane which was returned to further contact with another portion of the aluminum bromide-containing sludge.

The nature of the present invention and of its commercial utility can be seen from the specification and examples given, although neither section is intended to be unduly limiting on its generally broad scope.

I claim as my invention:

1. A process for obtaining relatively pure aluminum bromide from an aluminum bromide-containing sludge arising from the use of aluminum bromide as catalyst in hydrocarbon conversion reactions which process comprises contacting said sludge with a normally gaseous paraffinic solvent at a temperature above the normal boiling point of the solvent and under sufficient pressure to maintain a substantial portion of the solvent in liquid phase, separating resultant solution from undissolved matter, cooling the solution to a temperature in the range of substantially 0 to −80° C. to crystallize aluminum bromide, and recovering the latter.

2. A process for obtaining relatively pure aluminum bromide from an aluminum bromide-containing sludge arising from the use of aluminum bromide as a catalyst in hydrocarbon conversion reactions which process comprises contacting said sludge with a normally gaseous paraffinic solvent at a temperature above the normal boiling point of the solvent and under sufficient pressure to maintain a substantial portion of the solvent in liquid phase, separating the resulting solution from undissolved matter, cooling the solution under sufficient pressure to retain said solvent in the liquid phase to a temperature in the range substantially of 0 to −80° C. to crystallize aluminum bromide, and recovering the latter.

3. The process as defined in claim 2 and further characterized by employing butane as said normally gaseous paraffinic solvent and cooling the solution to a temperature of approximately −50° C.

HERMAN PINES.